United States Patent [19]
Gill

[11] Patent Number: 5,375,099
[45] Date of Patent: Dec. 20, 1994

[54] TRANSDUCER WITH ACOUSTIC MATCHING MEMBER AND METHOD OF MAKING THE TRANSDUCER

[75] Inventor: Michael J. Gill, Milford on Sea, United Kingdom

[73] Assignee: British Gas PLC, London, England

[21] Appl. No.: 100,180

[22] Filed: Aug. 2, 1993

Related U.S. Application Data

[63] Continuation of Ser. No. 714,618, Jun. 13, 1991, abandoned.

[30] Foreign Application Priority Data

Jul. 24, 1990 [GB] United Kingdom ............... 9016192

[51] Int. Cl.⁵ .......................................... H04R 17/00
[52] U.S. Cl. ................................... 367/140; 367/152; 29/25.35; 310/334
[58] Field of Search ............... 29/25.35; 367/152, 140; 310/323, 334, 336, 337

[56] References Cited

U.S. PATENT DOCUMENTS 3,634,562  1/1972  Kole et al. ........................... 261/41

FOREIGN PATENT DOCUMENTS

| | | |
|---|---|---|
| 384642 | 5/1987 | Austria . |
| 0013156 | 7/1980 | European Pat. Off. . |
| 0119855 | 9/1984 | European Pat. Off. . |
| 1473345 | 2/1967 | France . |
| 2454491 | 11/1980 | France . |
| 2739748 | 3/1978 | Germany . |
| 3431620 | 3/1986 | Germany . |
| 3622780 | 1/1988 | Germany . |

Primary Examiner—J. Woodrow Eldred
Attorney, Agent, or Firm—Oblon, Spivak, McClelland, Maier & Neustadt

[57] ABSTRACT

A method for bonding together adjoining hollow glass spheres to form an acoustic matching member for a transducer comprises subjecting a mixture of adjoining spheres and a solution of a heat curable resin and a volatile organic solvent to a first temperature to drive off the solvent and then to a second temperature to cure the resin. This causes the spheres to bond together at their points of contact but otherwise voids are formed between the spheres.

26 Claims, 2 Drawing Sheets

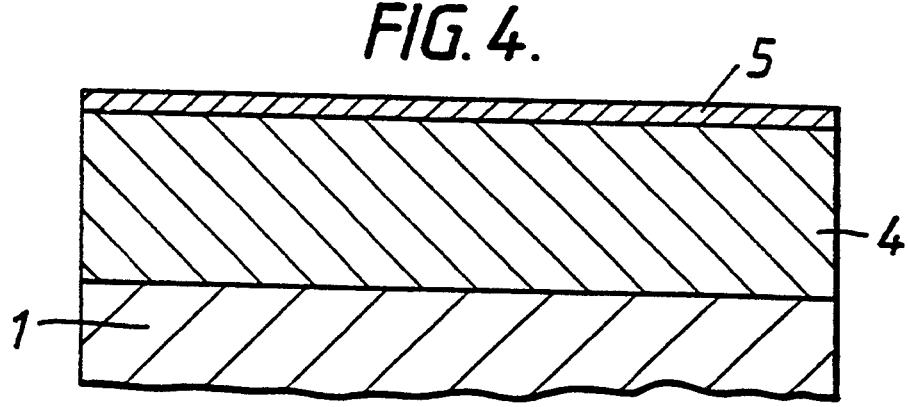
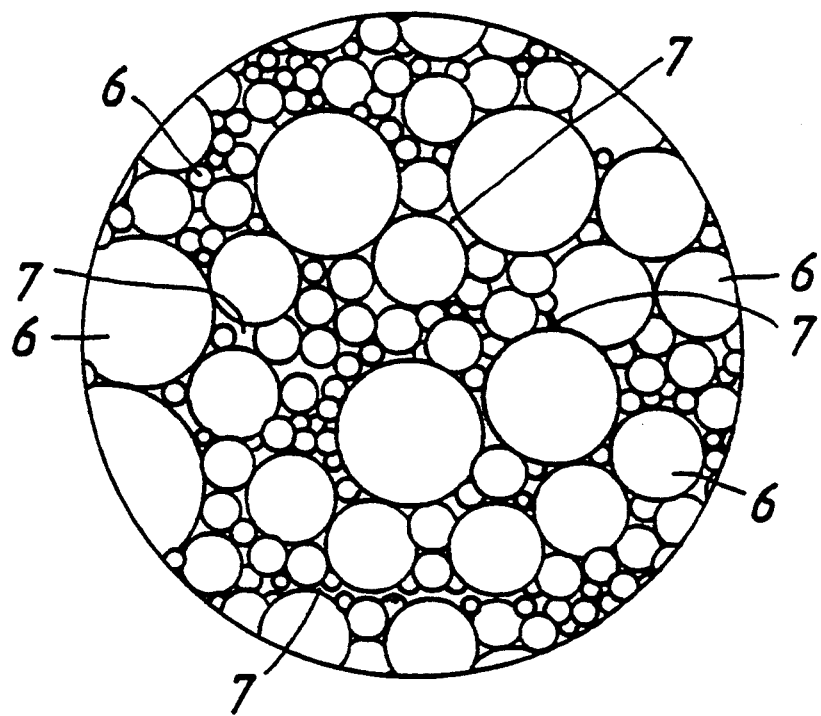

TRANSDUCER WITH ACOUSTIC MATCHING MEMBER AND METHOD OF MAKING THE TRANSDUCER

This is a division, of application Ser. No. 07/714,618, filed on Jun. 13, 1991, now abandoned.

The present invention relates to a method for bonding together hollow glass spheres to form an acoustic matching member for a transducer, to a matching member so formed and to a transducer incorporating such a member.

UK Published Patent Application No. 2225426 discloses a method for bonding together hollow glass spheres to form an acoustic matching member for a transducer.

In the method the spheres, eg. microspheres or bubbles, are placed in a mould to form a matrix or bed which is heated to a temperature where the glass softens and is then compressed to reduce the overall volume occupied by the spheres so that adjoining spheres bond together as by sintering. The temperature conditions and the compression conditions are so controlled as deliberately to cause the formation of voids between those sphere surfaces which have not bonded together because of the spherical shape of the spheres. It is important that a high percentage of the matrix is occupied by voids so as to produce a low acoustic impedance ($3 \times 10^5$ or lower) to provide acceptable acoustic coupling between a gas and the piezo element of the transducer. It is also important that bonding between adjoining spheres is substantially complete. If too many touching spheres are not bonded to their neighbours the impedance becomes unpredictable and varies with acoustic intensity. Unfortunately with the bonding method described it has been found that certain spheres remain unbonded to their neighbours, particularly those in the centre of the matrix and distant from the source of compression during sintering. Furthermore it has been found that in use spheres may unbond from their neighbours.

It is therefore an object of the present invention to reduce the degree of unbonding described.

According therefore to one aspect of the present invention, we provide a method for bonding together adjoining hollow glass spheres to form acoustic matching member for a transducer, the method comprising subjecting a mixture of adjoining spheres and a solution of a heat curable resin and a volatile organic solvent to a temperature sufficient to drive off the solvent and cure the resin thereby to cause the adjoining spheres to bond together, the size and packing density of the spheres and the concentration of the resin in the solvent being so chosen that voids are left between external surfaces of the bonded spheres away from points of contact.

According to another aspect of the present invention we provide a method for forming an acoustic matching member for a transducer comprising causing a resin to bond together adjoining spheres in a matrix of hollow glass spheres in such a way that voids are formed between the external surfaces of the spheres away from points of contact.

According to yet another aspect of the present invention we provide an acoustic matching member for a transducer comprising a matrix of hollow glass spheres bonded together by a resin in such a way that voids remain between external surfaces of the spheres, away from points of contact.

According to a still further aspect of the present invention we provide a transducer incorporating the above defined member affixed to a piezo-element.

An embodiment of the invention will now be described with reference to the accompanying drawings in which:

FIG. 4 is an amplified view of the matching member of the transducer, and

FIG. 5 is a further amplified view of the microstructure of the circled portion of the matching member of FIG. 4.

Figure 1:
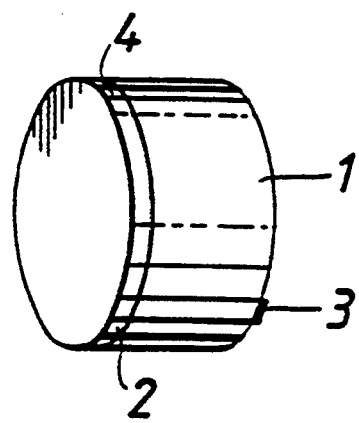
FIG. 1 is a perspective view from the side of a transducer.
Figure 2:
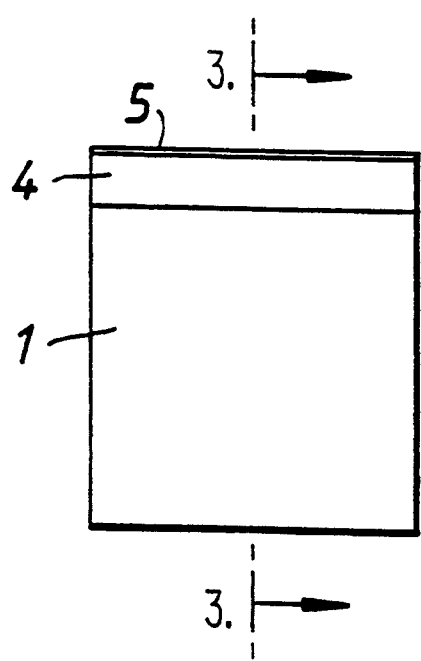
FIG. 2 is a general side view.
Figure 3:
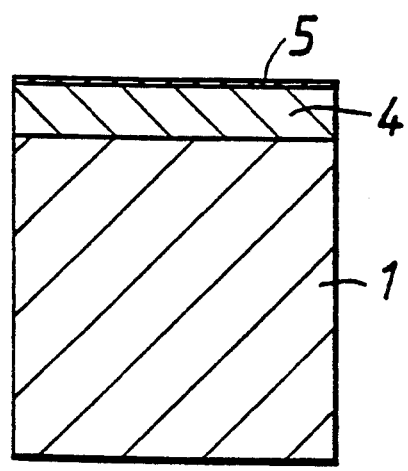
FIG. 3 is a view along lines A—A of FIG. 2.

Referring to FIGS. 1 to 4 the transducer comprises a piezo element, for example, of type PZT4 or PZT5A, in the form of a PZT cylinder 1 with electrical connecting wires 2, 3 (FIG. 1), an acoustically matching member 4 for the cylinder 1 and a protective layer for the member 4 in the form of a thin disc 5 (see FIGS. 2 to 4).

The matching member 4 which is in the form of a cylinder affixed to one end face of the PZT cylinder 1 has one of the wires 2 connected to its circumferential wall while the other wire 3 is connected to the other end face of cylinder 1.

As shown in FIG. 5, the matching member 3 comprises a close packed matrix of glass bubbles or microspheres 6, adjoining bubbles 6 being bonded together by a resin in the region of points of contact, while voids 7 are deliberately formed between the external surfaces of the bubbles 6.

The bubbles 6 are of the type A16/500 manufactured by 3M and known as C-glass. The bubble size ranges between 20 and 130 $\mu$m, average size 60 $\mu$m.

The resin is an epoxy. A typical resin is ER1040 made by Design Resins Ltd. This is a two-part high temperature curing epoxy.

The disc 5 is of polyimide (trade name Kapton) which may be 0.07 mm thick. Instead of a disc a cup-shaped layer may be used to offer side as well as end protection. Instead of a plastics material a metal could be used as the protective layer if thin enough eg. aluminium. The transducer is manufactured in the following way. Firstly, the resin is dissolved in a suitable solvent such as acetone. The ratio of the resin by weight to the solvent in the solution lies within the range (1 to 10) to (1 to 1) for example, 1:2. The viscosity of such a solution may be little more than the viscosity of the solvent, for example in the range 0.3 to 10 centipoise.

The glass bubbles are then added to the solution to "absorb" all the solution ie. until the final resin/solution mix is stiff with no visible liquid content. The packing density of the bubbles at this stage approaches the close-packed state.

The protective disc is then inserted through the open end of a known type cylindrical mould which may be of silicone rubber until the disc rests on the base thereof. The mould has the same internal diameter as the external diameter of the PZT cylinder.

A quantity of the bubble/solution mixture is then transferred by means of a spatula say into the mould leaving an uppermost cavity into which is next inserted the PZT cylinder.

A reasonably constant pressure is then exerted on the cylinder by means of a known spring loaded plunger to urge the cylinder towards the bubble/solution mix to compress it.

The mould is then heated to a temperature above the boiling point of the solvent in order to drive it off. In the case of acetone solvent this may be 120° C. Then the mould is heated to a temperature sufficient to cure the resin which in the case of the two-part epoxy described may be the same 120° C. or up to 180° C. while the pressure is still applied.

This procedure provides a transducer of the type previously described with a cylindrical matching member located between a PZT cylinder and a protective disc, both of which are affixed by the resin to the member.

The resin causes the spheres to bond to each other at their points of contact but otherwise voids are left between the spheres.

In this way the matching member may form a ¼ wavelength acoustic coupling for the transducer if of the correct length for the PZT cylinder.

I claim:

1. A method of forming a transducer comprising subjecting a mixture of adjoining hollow rigid spheres and a solution of a heat curable resin and a volatile organic solvent to a temperature sufficient to drive off the solvent and cure the resin thereby to cause the adjoining spheres to bond together to form an acoustically matching member having at least one surface, the size and packing density of the spheres and the concentration of the resin in the solvent being so chosen that voids are otherwise left between external surfaces of the spheres away from points of contact, placing a piezo element on the surface of the member so formed and subjecting the member and the element to a compressive force to compress the member and cause the element to be affixed to the member.

2. A method as claimed in claim 1 in which the spheres are of glass.

3. A method as claimed in claim 1 in which before the mixture is subjected to the temperature sufficient to drive off the solvent and cure the resin it is poured into a mould and the piezo element is placed on top of the mixture following which the mixture is subjected to the temperature sufficient to drive off the solvent and cure the resin thereby to cause the adjoining spheres to bond together and the mixture is then subjected to a compressive force to urge the element towards the mixture to compress the mixture and to adhere to the mixture after curing.

4. A method as claimed in claim 3 in which the mould and the element are both cylindrical.

5. A method as claimed in claim 1 in which the size of the spheres ranges between 10 and 130 μm.

6. A method as claimed in claim 1 in which the packing density of the spheres lies within the range between 10% and 100% of fully close packed.

7. A method as claimed in claim 1 in which the ratio of the resin by weight to the solvent in the solution lies within the range 2:1 to 1:20.

8. A method as claimed in claim 3 in which before the mixture is poured into a mould a member to serve as a protective front face for the member is placed in the mould, the face subsequently adhering to the member when the resin is cured.

9. A method as claimed in claim 2 in which the glass is C-glass.

10. A method as claimed in claim 1 in which the resin is an epoxy.

11. A method as claimed in claim 1 in which the solvent is acetone.

12. A method as claimed in claim 8 in which the member is a disc.

13. A method as claimed in claim 8 in which the member is a cup.

14. A transducer comprising a matching member formed of a matrix of hollow rigid spheres bonded together by a resin in such a way that voids remain between external surfaces of the spheres away from points of contact and a piezo element affixed to the matching member.

15. A transducer as claimed in claim 14, in which the spheres are of glass.

16. A transducer as claimed in claim 15 in which the size of the spheres ranges between 10 and 130 μm.

17. A transducer as claimed in claim 15 in which the packing density of the spheres lies within the range between 10% and 100% of close packed.

18. A transducer as claimed in claim 15 in which the glass is C-glass.

19. A transducer as claimed in claim 14 in which the resin is an epoxy.

20. A transducer as claimed in claim 14 in which the matching member is in the form of a cylinder having opposed faces, the element being affixed to one face thereof.

21. A transducer as claimed in claim 14 in which the element is a cylinder.

22. A transducer as claimed in claim 20 in which a protective layer is affixed to the other face of the member.

23. A transducer as claimed in claim 22 in which the layer is a disc.

24. A transducer as claimed in claim 22 in which the layer is a cup.

25. A transducer as claimed in claim 19, wherein the epoxy is a 2-part high temperature curing epoxy.

26. A transducer as claimed in claim 14, wherein the matching member forms a ¼ wavelength acoustic coupling for the transducer.

* * * * *